United States Patent
Madeo et al.

(10) Patent No.: US 11,372,199 B2
(45) Date of Patent: Jun. 28, 2022

(54) LASER-DRIVEN MICROPLASMA XUV SOURCE

(71) Applicant: Okinawa Institute of Science and Technology School Corporation, Onna-son Okinawa (JP)

(72) Inventors: Julien Dominique Georges Madeo, Onna-son Okinawa (JP); Michael K. L. Man, Onna-son Okinawa (JP); Keshav M. Dani, Onna-son Okinawa (JP)

(73) Assignee: OKINAWA INSTITUTE OF SCIENCE AND TECHNOLOGY SCHOOL CORPORATION, Okinawa (JP)

(*) Notice: Subject to any disclaimer, the term of this patent is extended or adjusted under 35 U.S.C. 154(b) by 247 days.

(21) Appl. No.: 16/845,419

(22) Filed: Apr. 10, 2020

(65) Prior Publication Data
US 2020/0333559 A1    Oct. 22, 2020

Related U.S. Application Data

(60) Provisional application No. 62/834,829, filed on Apr. 16, 2019.

(51) Int. Cl.
G02B 7/182     (2021.01)
G02B 19/00     (2006.01)
H05G 2/00      (2006.01)

(52) U.S. Cl.
CPC ....... *G02B 7/1827* (2013.01); *G02B 19/0009* (2013.01); *G02B 19/0047* (2013.01); *H05G 2/008* (2013.01)

(58) Field of Classification Search
CPC .............. G02B 7/1827; G02B 19/0009; G02B 19/0047; H05G 2/008
See application file for complete search history.

(56) References Cited

U.S. PATENT DOCUMENTS

| | | |
|---|---|---|
| 4,630,274 A | 12/1986 | Schafer |
| 5,577,092 A | 11/1996 | Kublak et al. |
| 2003/0194055 A1 | 10/2003 | Mochizuki |

(Continued)

FOREIGN PATENT DOCUMENTS

| | | |
|---|---|---|
| DE | 102 51 435 B3 | 5/2004 |
| EP | 2 951 643 A1 | 12/2015 |

(Continued)

OTHER PUBLICATIONS

Mendham K J et al., "Measurement and Optimisation of Ion Energies", Conference on Lasers and Electro-Optics. Dated May 19, 2002, 1 page.

(Continued)

*Primary Examiner* — Nicole M Ippolito
*Assistant Examiner* — Hanway Chang
(74) *Attorney, Agent, or Firm* — Hickman Becker Bingham Ledesma LLP; Edward A. Becker

(57) ABSTRACT

Systems and methods for generating extreme ultraviolet radiation from plasma are described herein. In an embodiment, gas is provided to a gas target within a vacuum chamber. A pulse laser or a pulse laser-driven wavelength conversion system provides a beam which is focused through a lens or microscope object onto the gas target to produce plasma. A collection mirror is then used to guide an extreme ultraviolet radiation beam from the plasma to a target location.

16 Claims, 6 Drawing Sheets

(56) References Cited

U.S. PATENT DOCUMENTS

2008/0104828 A1    5/2008  Someya et al.
2013/0228695 A1    9/2013  Mizoguchi et al.

FOREIGN PATENT DOCUMENTS

NL          2 021 854 A     11/2018
WO         WO 99/51357 A1   10/1999
WO      WO 2005/096680 A1   10/2005
WO       WO2014/120985 A1    8/2014

OTHER PUBLICATIONS

Fiedorowicz et al., "Strong Extreme Ultraviolet Emission from a Double-Stream Xenon/Helium Gas Puff Target Irradiated with a Nd:YAG Laser", vol. 184, No. 1-4, dated Oct. 2000, pp. 161-167.
European Patent Office, "Search Report" in application No. 20169045.0-1212, dated Oct. 14, 2020, 18 pages.
European Claims in application No. 20169045.0-1212, dated Oct. 2020, 3 pages.
Borghese et al., "Laser-Plasma-Based Vacumm-Ultraviolet Light Source for Tunable Single-Photon Ionization" Applied Optics, Optical Society of America, vol. 46, No. 22, dated Aug. 1, 2007, 6 pages.
European Patent Office, "Communication pursuant to Article 94(3) EPC" in application No. 20169045.0-1212, dated Mar. 4, 2021, 5 pages.
European Claims in application No. 20169045.0-1212, dated Mar. 2021, 3 pages.
Blattermann et al., "Atomic Line Emission and High-Order Harmonic Generation in Argon Driven by 4-MHz Sub-uJ Laser Pulses," Physical Review A 89, 043404 (2014), 5 pages.

LASER-DRIVEN MICROPLASMA XUV SOURCE

BENEFIT CLAIM

This application claims the benefit of Provisional Application 62/834,829, filed Apr. 16, 2019, the entire contents of which is incorporated by reference as if fully set forth herein, under 35 U.S.C. § 119(e).

FIELD OF THE INVENTION

The present application relates to methods and devices for generating ultraviolet radiation from plasma.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Since the emergence of femtosecond amplifier systems, driving a plasma in a gas has attracted tremendous attention as a powerful way to generate extreme electromagnetic radiation. This technique has pushed the frontiers of light allowing for the generation of extreme ultraviolet (XUV) radiation (10-100 eV). The ability to generate such extreme radiation in an optics lab, as opposed to large facilities like synchrotrons represents a major technological advantage. The existing strategy is the use of short laser pulses (typ. <50 fs) in a loose focusing geometry with kHz, mJ-class systems or tight focusing (>10 µm spot diameter) with multi-kHz/MHz µJ-class systems to create a plasma in a nonlinear medium (e.g. gas, liquid or solid) to generate XUV radiation with photon flux at the source as high as $10^{13}$ photons/s at a specific energy.

DETAILED DESCRIPTION

Figure 1:
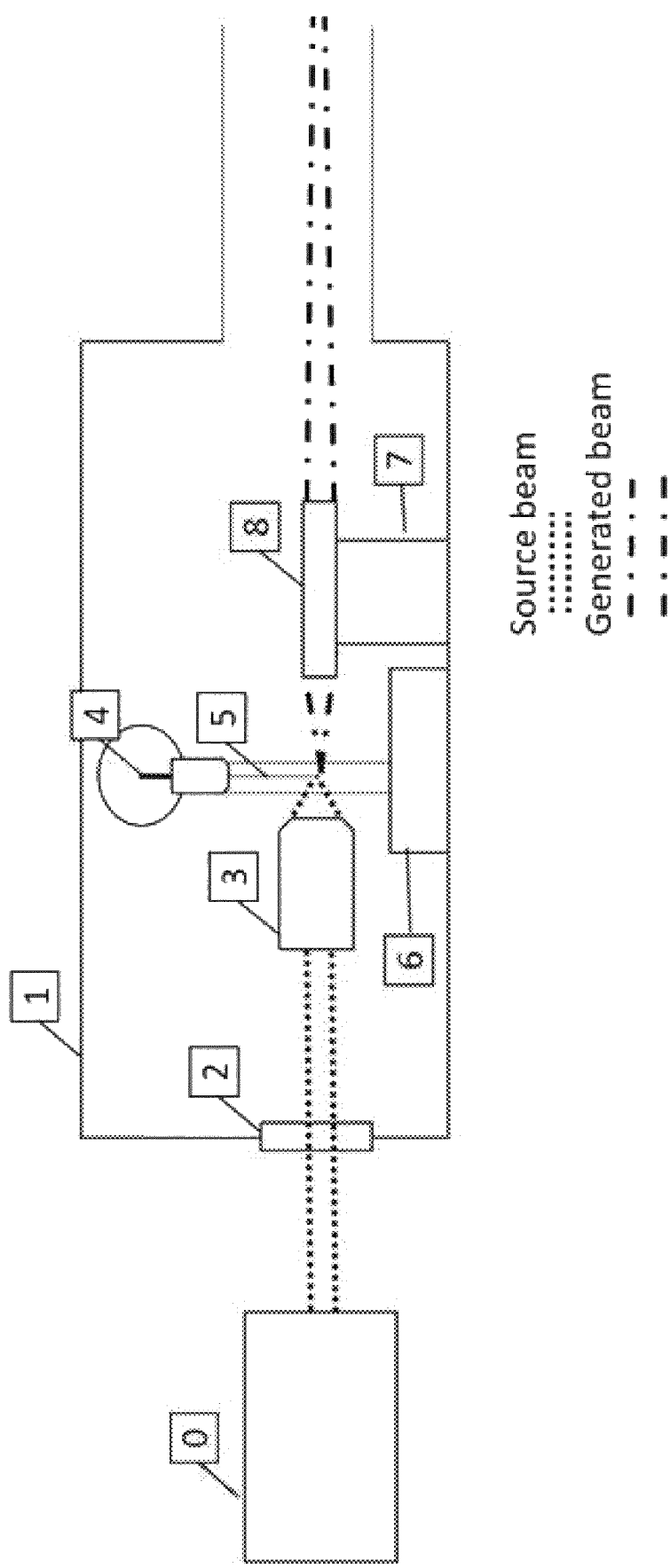
FIG. 1 depicts a side view of an example of a system configuration using a sub-µJ energy source.

In the following description, for the purposes of explanation, numerous specific details are set forth in order to provide a thorough understanding of the present disclosure. It will be apparent, however, that the embodiments may be practiced without these specific details. In other instances, well-known structures and devices are shown in block diagram form in order to avoid unnecessarily obscuring the present disclosure.

Overview

We provide a method based on extreme tight focusing (diameter of the laser spot equal or smaller than 6 µm) allowing, for example, the use of short pulse nJ-class systems or long pulse (>200 fs) µJ-class systems. Devices and methods for providing unprecedented signal-to-noise ratio in XUV generation are described herein. By creating a plasma using an extremely tight focusing geometry smaller than 6 µm spot size, the peak intensities required to reach the threshold to generate a plasma (>$10^{14}$ W/cm$^2$) allow the use of nJ-class or sub-µJ lasers as demonstrated herein and µJ-class systems with uncompressed longer pulse duration (>200 fs). The devices and methods described herein allow the transfer of plasma technology from amplifiers to compact, stable and high repetition rate oscillators and MHz tunable wavelength sources with pulse energies in the nJ to –µJ range. Achieving this provides a low-cost tool with unprecedented signal-to-noise ratio.

In an embodiment, a device comprises a vacuum chamber; a gas target within the vacuum chamber; a gas target; a gas feed configured to deliver gas into the gas target; a pulsed laser or a pulse laser-driven wavelength conversion source; a lens or microscope objective configured to focus a beam from the pulsed laser or pulsed laser-driven wavelength conversion source onto the gas target to generate plasma in the gas target; and a collection mirror configured to guide a generated beam from the plasma to a target location.

In an embodiment, the device further comprises a multi-axis piezo stage physically coupled to the gas target and communicatively coupled to a computing system, wherein the multi-axis piezo stage is configured to control positioning of the gas target based on input received from the computing system.

In an embodiment, the device further comprises a multi-axis piezo stage physically coupled to the collection mirror and communicatively coupled to a computing system, wherein the multi-axis piezo stage is configured to control positioning of the collection mirror based on input received from the computing system.

In an embodiment, the device further comprises a gas recycling unit either through direct collection from the vacuum pumps of the vacuum chamber or via a dedicated collection unit implemented in the vacuum chamber.

In an embodiment the gas target comprises a smallest dimension no more than 250 µm.

In an embodiment, the gas feed is configured to deliver the gas into the gas target at a focus pressure of at least 0.1 MPa.

In an embodiment the lens or microscope objective is configured to focus the beam to a power density larger than $10^{14}$ W/cm$^2$.

In an embodiment the pulsed laser-driven wavelength conversion source comprises a repetition rate higher than 100 kHz.

In an embodiment, the pulsed laser or pulsed laser-driven wavelength conversion source is configured to deliver pulses ranging from sub-10 femtosecond to 10 picosecond.

In an embodiment, the lens or microscope objective is configured to focus the beam onto the gas target at a diameter of no more than 6 µm.

In an embodiment, the device further comprises a metal foil or pinhole configured to dump fundamental power and/or provide ultraviolet energy selection.

In an embodiment, a method for generating extreme ultraviolet radiation from plasma comprises using a lens or microscope objective, focusing a beam from a pulsed laser or a pulse laser-driven tunable wavelength source onto a gas target within a vacuum chamber to generate plasma in the gas target; and guiding a generated beam from the plasma to a target location using a collection mirror.

In an embodiment, the method further comprises controlling a position of the gas target using a multi-axis piezo stage physically coupled to the gas target based on input received from a computing system communicatively coupled to the multi-axis piezo stage.

In an embodiment, the method further comprises controlling a position of the collection mirror using a multi-axis piezo stage physically coupled to the collection mirror based on input received from a computing system communicatively coupled to the multi-axis piezo stage.

In an embodiment, the gas target comprises a smallest dimension no more than 250 μm.

In an embodiment, the method further comprises feeding gas target to the gas at a focus pressure of at least 0.1 MPa.

In an embodiment, focusing the beam comprises focus the beam to a power density larger than $10^{14}$ W/cm$^2$.

In an embodiment, the method further comprises providing the beam from the pulsed laser or the pulse laser-driven wavelength source to the lens or microscope objective the beam at a repetition rate higher than 100 kHz.

In an embodiment, the method further comprises providing beam from the pulsed laser or the pulse-laser driven wavelength source to the lens or microscope objective through pulses ranging from sub-10 femtosecond to 10 picosecond.

In an embodiment, focusing the beam from the pulsed laser or the pulse laser-driven wavelength source on the gas target comprises focusing the beam onto the gas target at a diameter of no more than 6 μm.

I. Configuration Example

FIG. 1 depicts a side view of an example of a system configuration using a sub-μJ energy source. In FIG. 1, light source 0 is configured to project light into vacuum chamber 1 through optical window 2. High pressure gas inlet and pipe 4 feeds gas to gas target 5 through a high-pressure adaptor comprising a hollow core capillary or gas nozzle. An optical lens or microscope objective lens 3 narrows the projected light through gas target 5 onto mirror 8. In an embodiment, computer-controlled stage 6 controls the position of gas target 5. In an embodiment, computer-controlled stage 7 controls the position of mirror 8. While FIG. 1 includes elements 0-8, other embodiments may include additional elements, fewer elements, and/or different elements. For example, an embodiment may be implemented with fixed locations for gas target 5 and/or mirror 8 and thus without computer-controlled stage 6 and/or computer-controlled stage 7.

Figure 2:
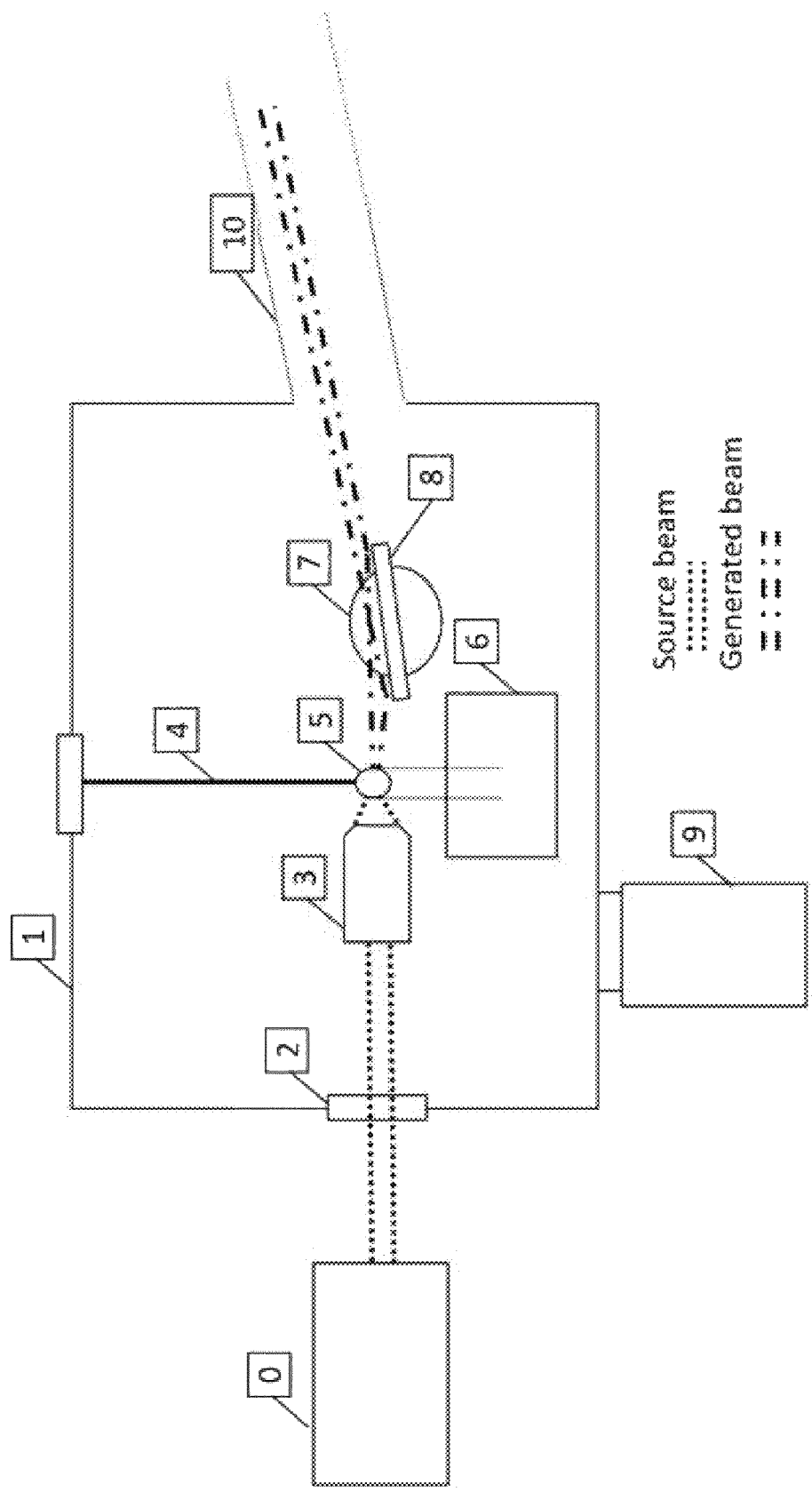
FIG. 2 depicts a top-down view of an example of a system configuration using a sub-µJ energy source.

FIG. 2 depicts a top-down view of an example of a system configuration using a sub-μJ energy source. In FIG. 2, vacuum pump 9 provides and/or maintains low pressure of the system. Vacuum line 10 provides a means for outputting the generated beam. While FIG. 2 includes elements 0-10, other embodiments may include greater, fewer, and/or different elements. For example, the system may include vacuum line 10 without a vacuum pump 9 or vice versa.

An embodiment of the device comprises of 10 main elements and an external light source: (0) a light source, (1) a vacuum chamber, (2) an optical window, (3) an optical lens or microscope objective lens, (4) a high pressure gas inlet and pipe, (5) a high pressure adaptor and hollow core capillary or nozzle, (6) a computer controlled multi-axis piezo stage controlling the position of assembly (5), (7) a computer controlled rotation and linear piezo stage controlling the position of assembly (8), (8) a flat or curved mirror or any other optical element to guide and/or focus the generated beam, (9) a turbo molecular vacuum pump, (10) a vacuum line to guide, transform and output the generated beam.

The beam from a pulsed femtosecond source (0) (oscillator/amplifier/tunable optical parametric amplifier) is guided through an optical window (2) into the vacuum chamber (1). The incoming beam is focused via a lens or microscope objective (3). The beam is focused on a high-pressure gas target delivered by (4) and (5) in which a micron scale plasma is formed. The position of the gas target related to the focal point is controlled via (6). The plasma acts as a wavelength converter. The plasma converts the incoming beam into a harmonic comb composed of odd harmonics of the fundamental incoming beam extending to the XUV range defined as the generated beam. The generated beam is then collected either by a flat metallic mirror or a curved mirror to be guided and/or focused to an experiment and/or an optical characterization line.

DETAILED DESCRIPTION (0) Light Source

The light source generates optical pulses of light at any wavelength ranging from the UV to the mid-IR. The light source can operate at a fixed wavelength or can be tunable through additional devices (e.g. Optical Parametric Amplifier (OPA), Non-colinear Optical Parametric Amplifier (NOPA) or Optical Parametric Chirped-Pulse Amplifier (OPCPA) OPA, NOPA or OPCPA) from UV to Mid-IR providing wavelength tunability of the generated XUV radiation. The source can directly or indirectly originate from an oscillator, amplifier or any device allowing wavelength conversion from UV to Mid-IR. The light source should provide enough peak power or pulse energy at the focus of element (3) in order to form a plasma (typ. >$10^{14}$ W/cm$^2$ at the focus).

The light source can include an assembly allowing to shorten and/or compress the light source pulse duration. A pulse dispersion compensation management may be included either based on prisms, Gires-Tournois Interferometer mirrors, chirped-mirrors or a spatial light modulator-based pulse shaper to ensure the shortest pulse duration (i.e. max peak power) at the focus.

(1) Vacuum Chamber

The vacuum chamber allows propagation without absorption of the generated beam and to allow direct connection with instruments requiring vacuum operation. Vacuum levels of $10^{-2}$ mbar or lower may be used to minimize optical losses. The vacuum chamber has specific flanges and connector to allow connection of turbo molecular pump (9), a gas inlet (4), an optical window (2) and vacuum compatible electrical connections to control (6) and (7) via a computer interface.

(2) Optical Window

The optical window is attached to the vacuum chamber (1) and is used to transmit the incoming beam from (0) to the vacuum chamber (1) and objective (3). The window can either be flat with or without an anti-reflection coating adapted to the wavelength(s) delivered by (0) or at a Brewster angle and made in a material adapted to the wavelength(s) and optical intensity delivered by (0).

(3) Lens or Microscope Objective

The lens or microscope objective is designed to provide an extreme tight focusing, i.e. a beam diameter at focus smaller than 6 μm. The focal length or numerical aperture of the objective is designed so an optical intensity larger than $10^{14}$ W/cm$^2$ is achieved at the focus. The objective can be anti-reflection coated for the wavelength(s) delivered by (0) to minimize optical losses and made of a material with a damage threshold lower than what is delivered by (0).

(4) Gas Feed

The gas feed is designed for a pressure up to 100 bars and is designed for, but not restricted to, non-corrosive gas (typ. He, N, Ar, Ne, Xe, Kr). The gas is delivered into the vacuum chamber by a metallic gas pipe. According to an embodiment, the gas pipe is flexible enough to allow motion and positioning of (5) by using the piezo stage (6).

(5) Gas Target

The gas pipe (4) in connected to (5) by using a high pressure adaptor in which either a hollow core capillary or a gas nozzle is mounted or sealed to generate a gas jet or a gas cell positioned at the focus of the microscope objective (3). The hollow core capillary or gas nozzle should be high pressure compatible may have an outer radius smaller than the working distance of (3) and an inner diameter ranged between 0.5 and 250 μm or any other geometry with the smallest dimension smaller than 250 μm.

(6) Computer Controlled Multi-Axis Piezo Stage

The adaptor holding the gas capillary (5) is mounted on the element (6). The goal of this part is to allow a precise positioning of the gas jet on the focus of the microscope objective (3) in order to optimize the efficiency of the generated beam. The piezo stage can be multi-axis with linear translation (XYZ) and tilt angles (2 axis). The stage may provide submicron precision. The stage may be computer controlled to allow optimization and positioning under vacuum operation. The stage can be vacuum compatible to provide lower operating pressure in the vacuum chamber (1).

(7) Linear and Rotation Piezo Stage for Collection Optic of the Generated Beam

This element controls the position (XY) and rotation angle of the collection mirror (8) to guide the generated beam at the desired application. The stage can be vacuum compatible to reduce the vacuum chamber pressure. The stage is computer controlled to allow beam steering under vacuum operation and optimization of the beam pointing and/or focusing at the desired area.

(8) Collection Mirror

The collection mirror collects the generated beam and guides it to an experiment/application. Multiple optics can also be used to collect and/or transform the generated beam. The mirror can be flat or curved (e.g. toroidal, ellipsoidal, spherical) to allow refocus of the generated beam at the desired area. The mirror area may be adapted to collect fully the diverging generated beam which depends on the generated wavelength and incoming beam diameter at focus. The mirror has to be made of a material providing high reflectivity in the generated beam spectral range (e.g. metals, multilayer mirrors, semiconductors). The mirror is mounted directly on (7).

(9) Turbo Molecular Vacuum Pump

The pump provides low pressure in the vacuum chamber and maintains low pressure during operation when the gas jet delivered by (5) is flowing. The turbo pump flow rate may be scaled to maintain a pressure lower than $10^{-2}$ mbar in relation with the gas flow/pressure of operation.

(10) Generated Beam Output

The generated beam output is designed at an angle defined by the reflection from the collecting optics. The output is under vacuum and can accommodate additional optics such as optical filters to select a specific harmonic from the generation beam or reject the remaining incoming beam, other steering mirrors, a spectrometer or an imaging charge-coupled device (CCD) to control the quality of the beam.

II. Long Pulse System Configuration Example

Figure 3:
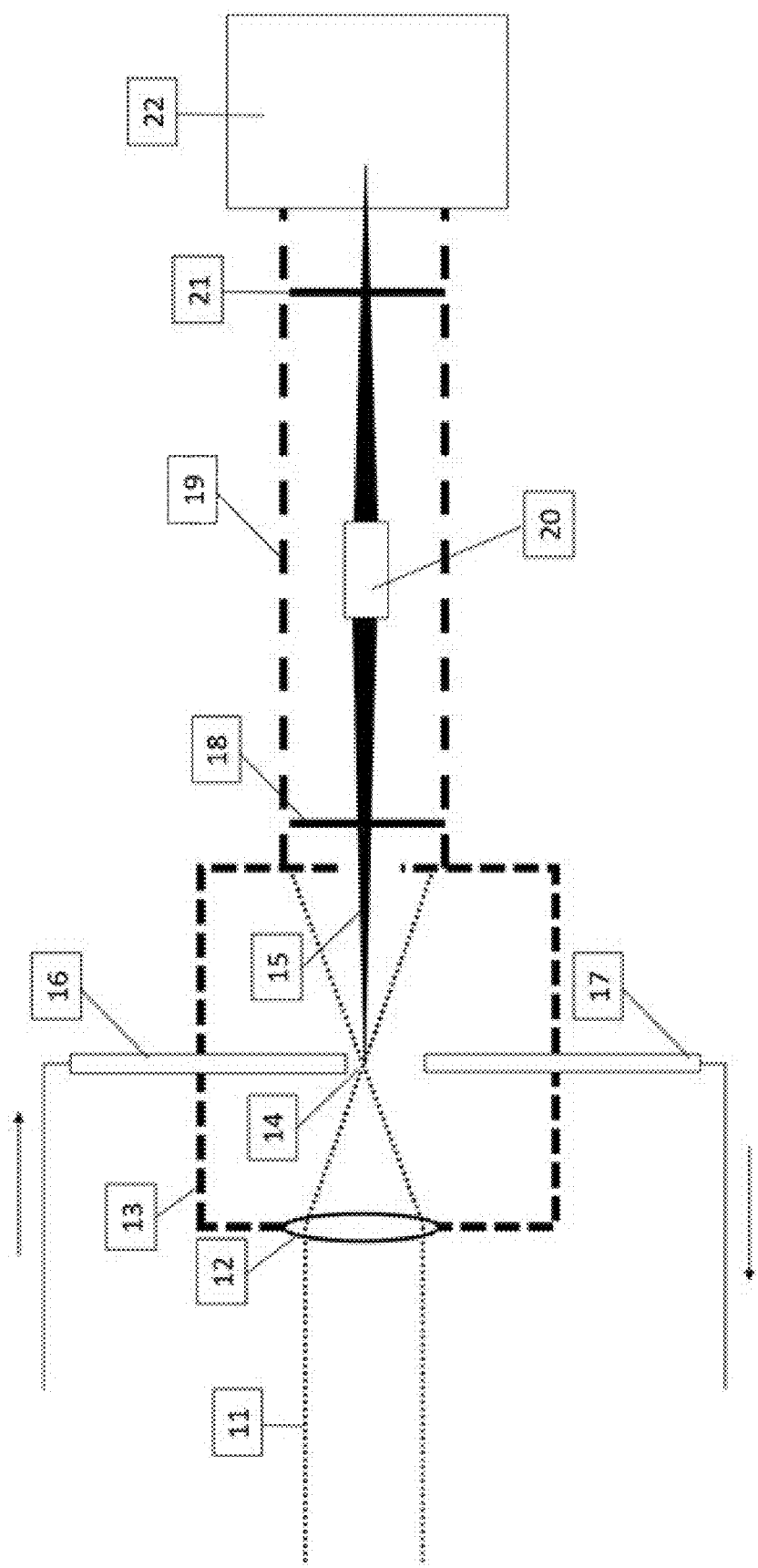
FIG. 3 depicts an example configuration using a µJ-class, long pulse system.

FIG. 3 depicts an example configuration using a μJ-class, long pulse system. An embodiment of the device comprises 12 main elements and an external light source: (11) a light source, (12) a focusing optical element, (13) a vacuum chamber pumped by a turbo molecular pump, (14) a gas jet at the focus of the focused source generating a plasma, (15) generated XUV radiation, (16) a high pressure adaptor and hollow core capillary or nozzle on a manual positioner or a computer controlled multi-axis piezo stage, (17) gas collection unit for recycling (18) a metal foil or pinhole to dump the fundamental power and/or provide XUV energy selection of generated XUV (15), (19) a vacuum line to guide the generated XUV, (20) an optical element to steer, collect and/or focus the generated XUV (15), (21) a second metal foil for XUV energy selection, (22) a XUV detector, camera or any application requiring XUV radiation. Other embodiments may use more or less elements, such as using fixed stages instead of computer-controlled stages.

(11) Light Source.

The light source generates optical pulses of light at any wavelength ranging from the UV to the mid-IR. The light source can operate at a fixed wavelength or can be tunable through additional devices (e.g. OPA, NOPA or OPCPA) from UV to Mid-IR providing wavelength tunability of the generated XUV radiation. The source can directly or indirectly originate from an oscillator, amplifier or any device allowing wavelength conversion from UV to Mid-IR. The light source should provide enough peak power or pulse energy at the focus of element (12) in order to form a plasma (typ. >$10^{14}$ W/cm$^2$ at the focus).

(12) Focusing Optical Element.

The lens or microscope objective is designed to provide an extreme tight focusing, i.e. a beam diameter at focus smaller than 6 μm. The focal length or numerical aperture of the objective is designed so an optical intensity larger than $10^{14}$ W/cm$^2$ is achieved at the focus. The objective can be anti-reflection coated for the wavelength(s) delivered by (11) to minimize optical losses and made of a material with a damage threshold lower than what is delivered by (11). The objective can be designed with a long working distance to facilitate the alignment with the gas target (14) delivered by (16).

(13) Vacuum Chamber

The vacuum chamber allows propagation with reduced absorption of the generated beam and to allow direct connection with instruments requiring vacuum operation. Vacuum levels of $10^{-2}$ mbar or lower may be used to minimize optical losses. The vacuum chamber has specific flanges and connector to allow connection of turbo molecular pump, a gas inlet (16), an optical window or focusing element (12) and vacuum compatible electrical connections to control (16) and (20) via a computer interface.

(14) Gas Target

Gas coming from a pressure regulated source and/or a gas recycling unit is connected to (16) by using a high pressure adaptor in which either a hollow core capillary or a gas nozzle is mounted or sealed to generate a gas jet positioned at the focus of the optical focusing element (12). The hollow core capillary or gas nozzle should be high pressure compatible may have an outer radius smaller than the working distance of (12) and an inner diameter ranged between 0.5 and 250 μm or any other geometry with the smallest dimension smaller than 250 μm.

(15) Generated XUV

The generated XUV radiation is copropagating with the incoming laser source (11).

(16) Gas Feed

The gas feed is designed for a pressure up to 100 bars and is designed for, but not restricted to, non-corrosive gas (typ. He, N, Ar, Ne, Xe, Kr). The gas is delivered into the vacuum chamber by a metallic gas pipe. The gas pipe should be flexible enough to allow motion and positioning of (14) by using a manual or motorized positioner.

(17) Gas Collector

The system can include a gas collection unit composed of a pipe, nozzle or capillary to collect the gas from (14) and to be extracted to a recycling/recompressing unit and reinjected into (16)

(18) Beam Dump and XUV Energy Filter

A metallic pinhole can be used to dump the diverging fundamental source (11) or a thin metal foil (e.g. Al, Sn) with a thickness <1 μm can be used to filter out the XUV radiation.

(19) Vacuum Beamline

The vacuum beamline beam output is designed at an angle defined by the reflection from the collecting optics. The output is under vacuum and can accommodate additional optics such as optical filters to select a specific harmonic from the generation beam or reject the remaining incoming beam, other steering mirrors, a spectrometer or an imaging CCD to control the quality of the beam. Additional turbo molecular pumps and ion pumps can be added to achieve differential pumping for applications requiring ultra high vacuum ($<10^{-9}$ mbar)

(20) XUV Optics

An optical element can be inserted in the vacuum beamline (19) to steer, collect and/or refocus the beam. This can include toroidal, ellipsoidal and/or parabolic metallic mirrors and multilayer XUV mirrors.

(21) XUV Energy Filtering

Additional metal foil filters (e.g. Al, Sn) can be inserted in the vacuum beamline (19) after the XUV optics (20) to provide additional XUV energy selection.

(22) XUV Characterization and Application

An XUV detector or camera can be positioned in the beamline to monitor and characterize the filtered XUV beam or can be directly connected to the required application.

III. Recycling Gas Unit

Figure 4:
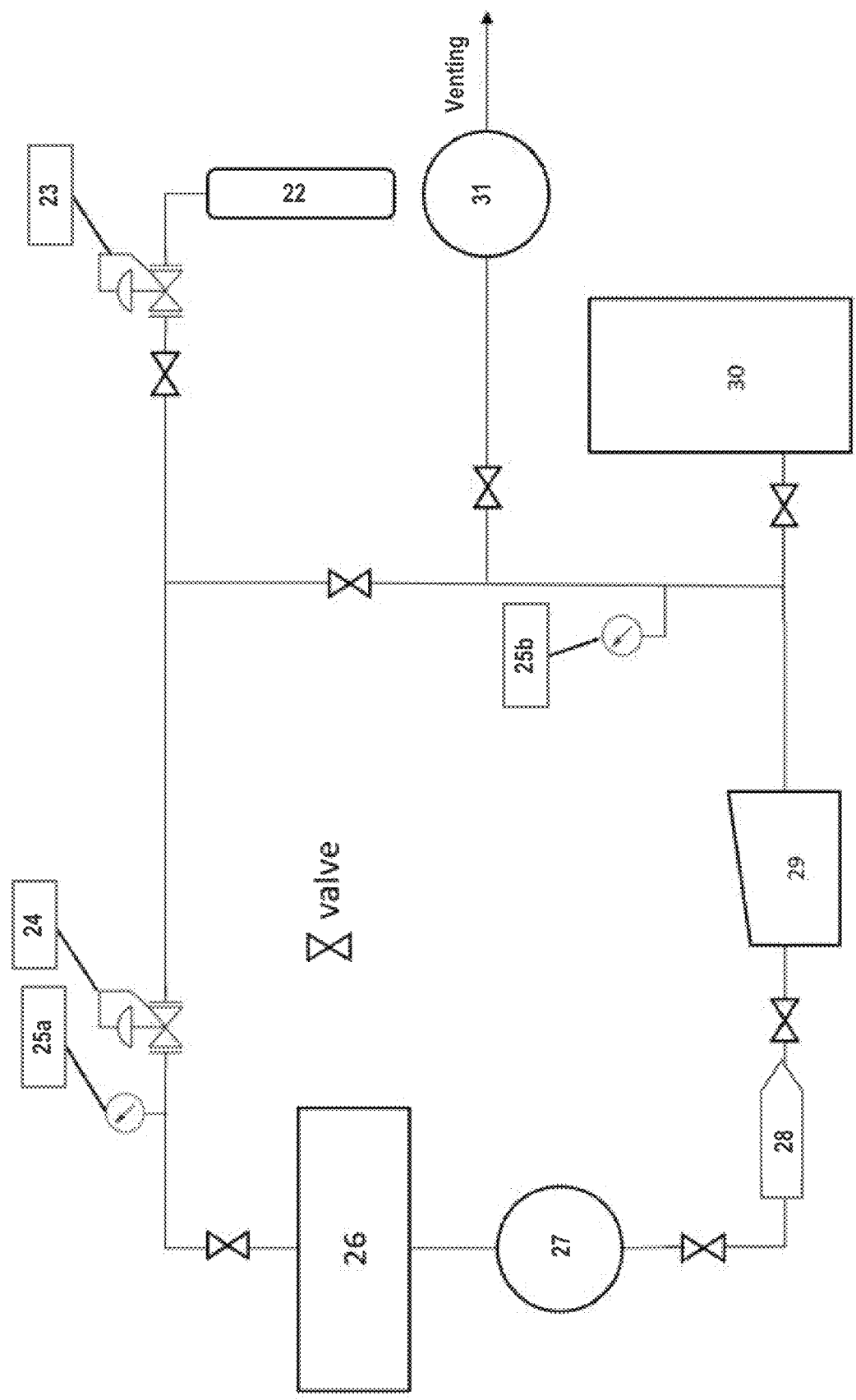
FIG. 4 depicts an example configuration of a gas recycling unit.

A gas recycling unit can be used to limit the gas consumption of the system and can be adapted to all the configurations described here and in particular in section II and III. FIG. 4 depicts an example configuration of a gas recycling unit.

A pressured gas source (22) delivers the gas to the unit though a gas pressure regulator (23) and a second gas pressure regulator 24 with a pressure gauge (25a). The gas feed the XUV generation module (26) and provides the required gas pressure (>0.2 MPa). The excess gas is collected by a scroll pump (27) and is then filtered with a particle filter (28) (e.g. zeolite trap) and recompressed in compressor (29). A gas buffer (30) can be used to store the excess gas with, for example, a capacity of 2 liters and a pressure up to 1 MPa. Compressed pressure is monitored with pressure gauge (25b) and gas is reinjected in a close loop manner towards the XUV generation module (26). A additional line with a scroll pump (31) can be added to vent the entire gas recycling unit.

IV. Additional Embodiments

Additional embodiments include compact and efficient sources of coherent extreme-UV based on the widely spread, stable, MHz repetition rate and nanojoule-class femtosecond oscillator technology. The generation process is based on optical nonlinearities (High Harmonic Generation) in a microplasma (<6 μm) formed in a gas target at the focus of a microscope objective allowing to reach optical intensities beyond tunnel ionization threshold even at low pulse energies (nJ range). This allows the use of oscillators systems or sub-μJ pulse energy systems to achieve compact, efficient, high repetition rate and low signal-to-noise XUV sources that benefits to a wide variety of applications such as photoemission spectroscopy, nano-imaging and attosecond science for the XUV range.

Microplasma-Based High Harmonics Generation (HHG) in the XUV Range

A specific embodiment relying on a MHz nJ-class oscillator and tight focusing in a gas jet with high NA(>0.7) objectives is described hereinafter. To reduce the pulse energy requirement while keeping a high optical intensity to generate the plasma, short pulses may be used (<40 fs) by using a gas-filled nonlinear fiber. In addition to generate short pulses, spatial light modulator-based pulse shaper or a compressor may be used to optimize the peak power/pulse duration at the focus.

All the generation and detection are included in a compact vacuum chamber to avoid absorption of XUV radiation. A gas capillary with a 10-250 μm core mounted on a piezo stage with up to 100 bar backing pressure of Ar, Kr or Xe gas. The XUV is then filtered out and specific harmonics selected using metal foil filters or multilayer mirrors acting as bandpass filters. The beam is then refocused by a toroidal mirror onto a XUV CCD.

Figure 6:
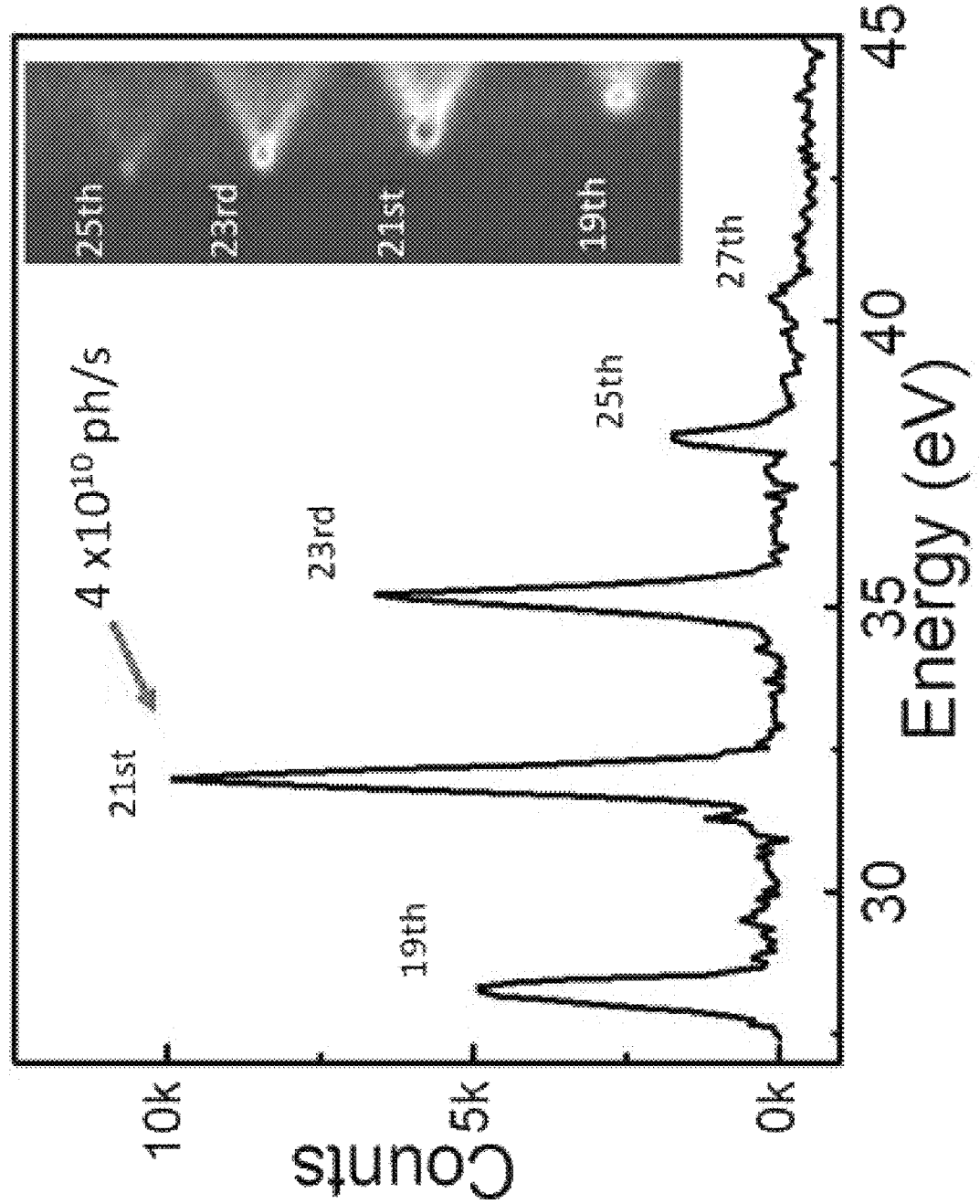
FIG. 6 depicts a spectrum comprising odd harmonics from $19^{th}$ to $27^{th}$ collected by an Au grating.

Data related to the embodiment are presented on FIG. 6 showing a spectrum comprising odd harmonics from $19^{th}$ to $27^{th}$ collected by an Au grating. A photon flux of $4\times10^{10}$ ph/s for harmonic $21^{st}$ (~31.5 eV) is measured.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
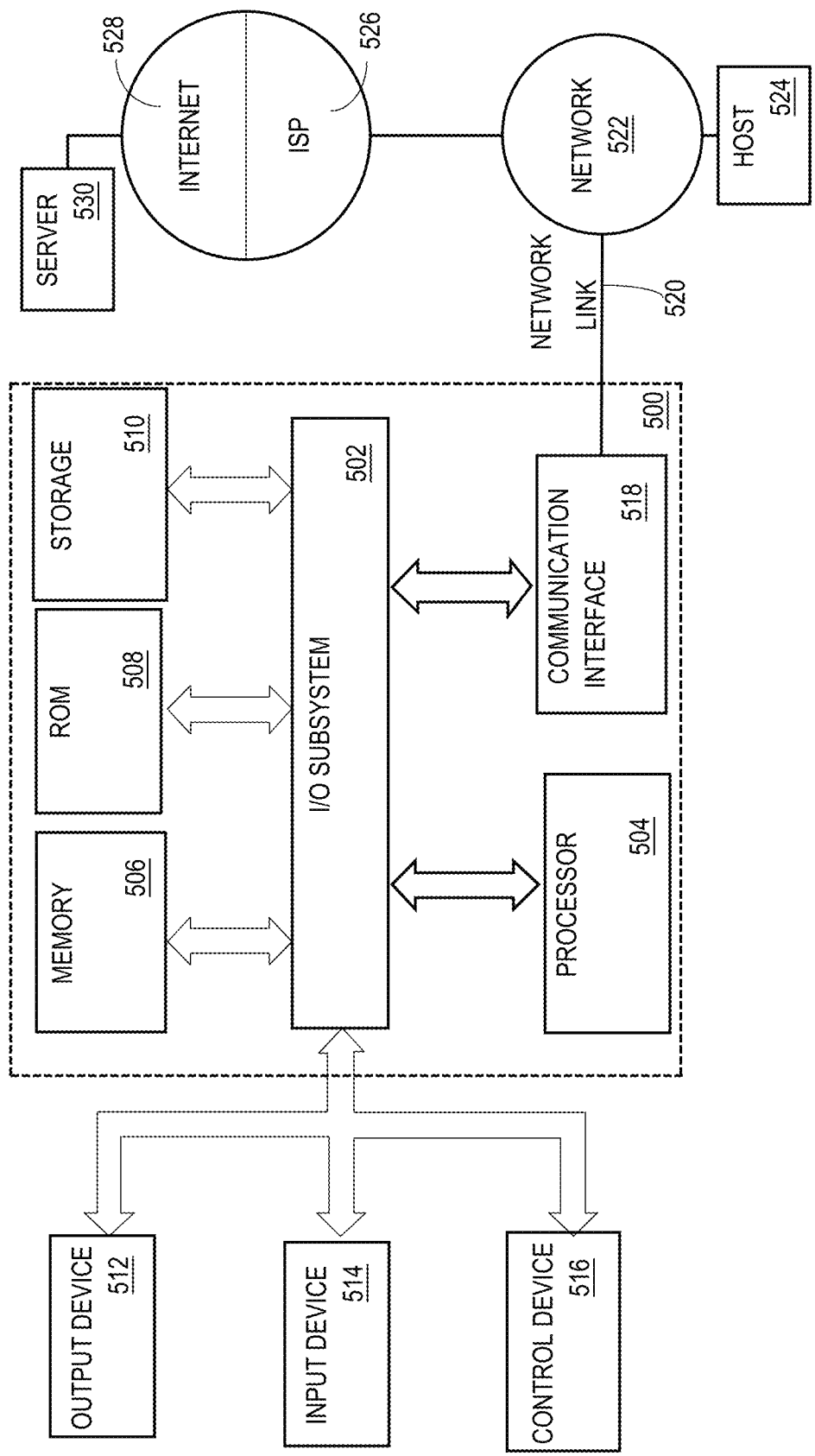
FIG. 5 is a block diagram that illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A device comprising:
    a vacuum chamber;
    a gas target within the vacuum chamber;
    a gas feed configured to deliver gas into the vacuum chamber at a focus pressure of at least 0.5 MPa gas target;
    a pulsed laser or a pulse laser-driven wavelength conversion source;
    a lens or microscope objective configured to focus a beam from the pulsed laser or pulsed laser-driven wavelength conversion source onto the gas target at a diameter of no more than 5 µm to generate plasma in the gas target; and
    a collection mirror configured to guide a generated beam from the plasma to a target location.

2. The device of claim 1, further comprising a multi-axis piezo stage physically coupled to the gas target and communicatively coupled to a computing system, wherein the multi-axis piezo stage is configured to control positioning of the gas target based on input received from the computing system.

3. The device of claim 1, further comprising a multi-axis piezo stage physically coupled to the collection mirror and communicatively coupled to a computing system, wherein the multi-axis piezo stage is configured to control positioning of the collection mirror based on input received from the computing system.

4. The device of claim 1, further comprising a gas recycling unit either through direct collection from one or more vacuum pumps of the vacuum chamber or via a dedicated collection unit implemented in the vacuum chamber.

5. The device of claim 1, wherein the gas target comprises a smallest dimension of no more than 250 µm.

6. The device of claim 1, wherein the lens or microscope objective is configured to focus the beam to a power density larger than $10^{14}$ W/cm$^2$.

7. The device of claim 1, wherein the pulsed laser-driven wavelength tunable source comprises a repetition rate higher than 100 kHz.

8. The device of claim 1, wherein the pulsed laser or pulsed laser-driven wavelength tunable source is configured to deliver pulses ranging from sub-10 femtosecond to 10 picosecond.

9. The device of claim 1, further comprising a metal foil or pinhole configured to dump fundamental power and/or provide ultraviolet energy selection.

10. A method for generating extreme ultraviolet radiation from plasma, the method comprising:
    feeding gas to a gas target at a focus pressure of at least 0.5 MPa;
    using a lens or microscope objective, focusing a beam from a pulsed laser or a pulsed laser-driven wavelength tunable source onto the gas target within a vacuum chamber at a diameter of no more than 5 µm to generate plasma in the gas target; and
    guiding a generated beam from the plasma to a target location using a collection mirror.

11. The method of claim 10, further comprising controlling a position of the gas target using a multi-axis piezo stage physically coupled to the gas target based on input received from a computing system communicatively coupled to the multi-axis piezo stage.

12. The method of claim 10, further comprising controlling a position of the collection mirror using a multi-axis piezo stage physically coupled to the collection mirror based on input received from a computing system communicatively coupled to the multi-axis piezo stage.

13. The method of claim 10, wherein the gas target comprises a smallest dimension of no more than 250 µm.

14. The method of claim 10, wherein focusing the beam comprises focus the beam to a power density larger than $10^{14}$ W/cm$^2$.

15. The method of claim 10, further comprising providing the beam from the pulsed laser or the pulse laser-driven wavelength tunable source to the lens or microscope objective at a repetition rate higher than 100 kHz.

16. The method of claim 10, further comprising providing the beam from the pulsed laser or the pulsed laser-driven wavelength tunable source to the lens or microscope objective through pulses ranging from sub-10 femtosecond to 10 picosecond.

* * * * *

UNITED STATES PATENT AND TRADEMARK OFFICE
CERTIFICATE OF CORRECTION

PATENT NO. : 11,372,199 B2
APPLICATION NO. : 16/845419
DATED : June 28, 2022
INVENTOR(S) : Julien Dominique Georges Madeo, Michael K. L. Man and Keshav M. Dani It is certified that error appears in the above-identified patent and that said Letters Patent is hereby corrected as shown below:

In the Claims

Claim 1, Column 11, Lines 65 and 66 delete "gas target"

Signed and Sealed this
Sixth Day of September, 2022

Katherine Kelly Vidal
*Director of the United States Patent and Trademark Office*